(12) United States Patent
Chen et al.

(10) Patent No.: US 7,486,504 B2
(45) Date of Patent: Feb. 3, 2009

(54) COMPUTER CASE

(75) Inventors: Yun-Lung Chen, Tu-Cheng (TW); Zong-Yu Zou, Shenzhen (CN); Zhou Xu, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Taipei Hsien (TW)

( * ) Notice: Subject to any disclaimer, the term of this patent is extended or adjusted under 35 U.S.C. 154(b) by 360 days.

(21) Appl. No.: 11/187,543

(22) Filed: Jul. 22, 2005

(65) Prior Publication Data

US 2006/0061956 A1 Mar. 23, 2006

(30) Foreign Application Priority Data

Sep. 17, 2004 (CN) .................. 2004 2 00884771 U

(51) Int. Cl.
*G06F 1/16* (2006.01)
(52) U.S. Cl. ...................................... 361/683; 361/685
(58) Field of Classification Search ................ 361/685, 361/679–686, 724–727, 683; 312/223.1, 312/223.2; 211/26, 211
See application file for complete search history.

(56) References Cited

U.S. PATENT DOCUMENTS

| 6,290,534 | B1 * | 9/2001 | Sadler ........................ 439/534 |
| 6,392,875 | B1 | 5/2002 | Erickson et al. |
| 6,507,487 | B1 * | 1/2003 | Barina et al. ................. 361/685 |
| 7,257,827 | B2 * | 8/2007 | Lee ............................. 720/653 |
| 2001/0046117 | A1 * | 11/2001 | Felcman et al. ............. 361/683 |

\* cited by examiner

*Primary Examiner*—Jayprakash N Gandhi
*Assistant Examiner*—Nidhi Desai
(74) *Attorney, Agent, or Firm*—Morris Manning Martin LLP; Tim Tingkang Xia

(57) ABSTRACT

A computer case includes a chassis (70), a cage (10) pivotably engaging with the chassis, a securing member (50) and an intermediate member (30). The cage has a locked position and a unlocked position. The securing member is mounted to the chassis. A receiving portion (57) is formed at the securing member. The intermediate member pivotably connects with the securing member and the cage respectively, and includes a resilient portion (35) corresponding to the receiving portion. When the cage is in the locked position, the resilient portion engages in the receiving portion. When the cage is in the unlocked position, the resilient portion disengages from the receiving portion.

17 Claims, 6 Drawing Sheets

COMPUTER CASE

BACKGROUND OF THE INVENTION

1. Field of the Invention

The present invention relates to a computer case, and more particularly to a computer case with a simplified configuration and convenient to use.

2. Description of Background

A typical computer case usually accommodates various data storage devices for communication and handling of data. Such devices include, for example, hard disk drives, floppy disk drives and Compact Disk-Read Only Memory (CD-ROM) drives. With the development of information technology, computer performance is rapidly improved, and many inner modules should correspondingly be upgraded. So, expansibility and convenience are important for computer design. Moreover, computers are more and more miniaturized, and computer inner space is getting more and more crowded. Drive cage of storage devices and some other frameworks occupy main inner space, so assembly and disassembly of function modules is unduly inconvenience.

A typical computer case includes a chassis and a drive cage. The drive cage receives a plurality of data storage devices. The drive cage and the chassis respectively define a shaft hole, and a shaft rotatablely connects the drive cage and the chassis by getting through the shaft holes. The drive cage forms a hook, and the chassis forms a resilient securing member engaging with the hook of the drive cage so as to mount the drive cage to the chassis. When the securing member of the chassis is pressed to disengage from the hook of the drive cage, the drive cage can be rotated out from the chassis. However, as described above, restrictive configurations to limit the rotation range of the drive cages are not disclosed.

Accordingly, what is needed is to provide a computer case having a rotatable cage which can vacate space for installation and removal of function modules of computer.

SUMMARY

A computer case includes a chassis, a cage pivotably engaging with the chassis, a securing member and an intermediate member. The cage has a locked position and a unlocked position. The securing member is mounted to the chassis. A receiving portion is formed at the securing member. The intermediate member pivotably connects with the securing member and the cage respectively, and includes a resilient portion corresponding to the receiving portion. When the cage is in the locked position, the resilient portion engages in the receiving portion. When the cage is in the unlocked position, the resilient portion disengages from the receiving portion.

Other objects, advantages and novel features of the present invention will be drawn from the following detailed description of preferred embodiment of the present invention with the attached drawings, in which:

DETAIL DESCRIPTION OF PREFERRED EMBODIMENT

Figure 1A:
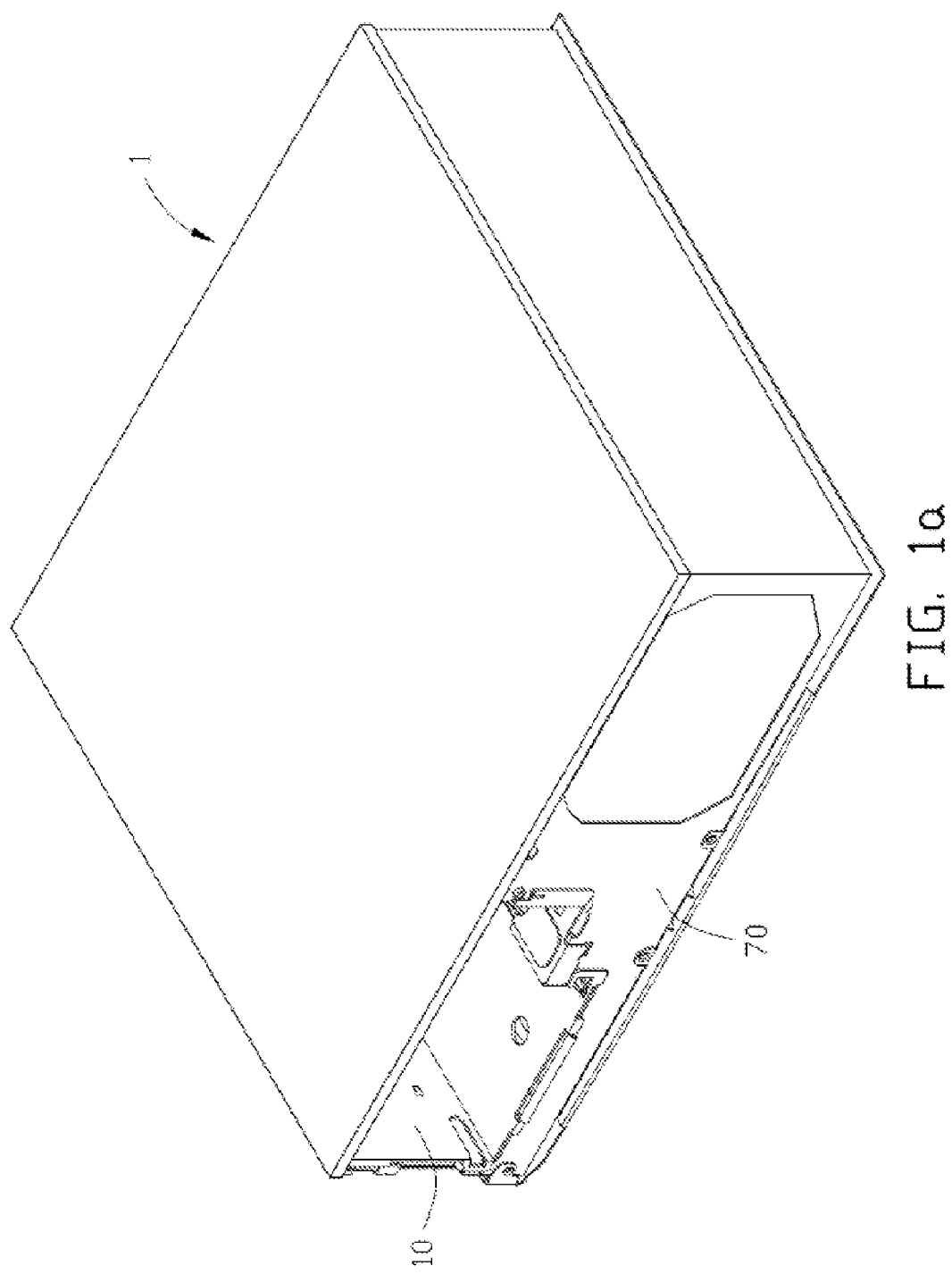
FIG. 1a is an isometric, assembled view of a computer case in accordance with a preferred embodiment of the present invention.
Figure 1:
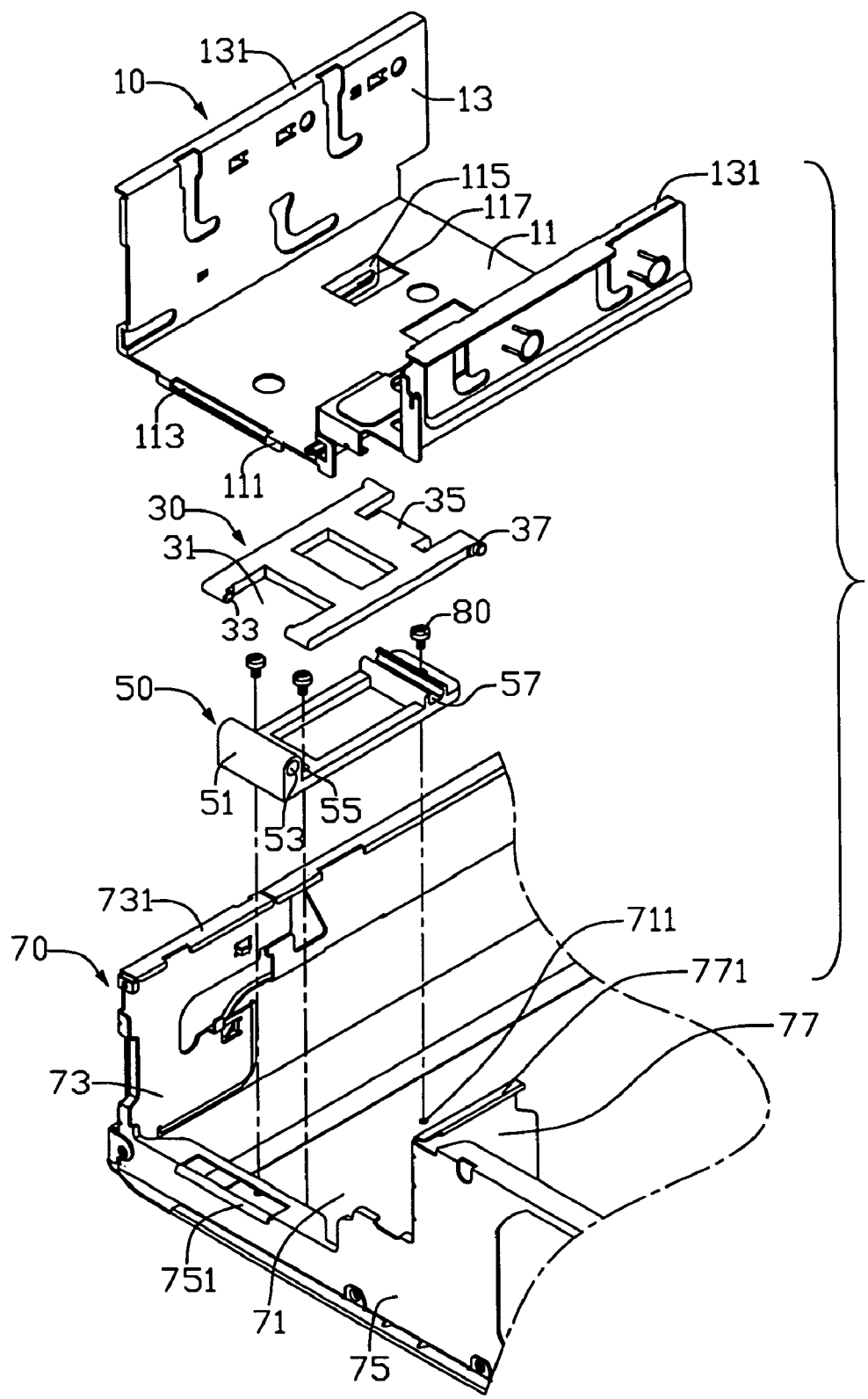
FIG. 1 is an exploded, isometric view of the computer case including a chassis, a cage, an intermediate member and a securing member, with partly cut off for better illustration.
Figure 2:
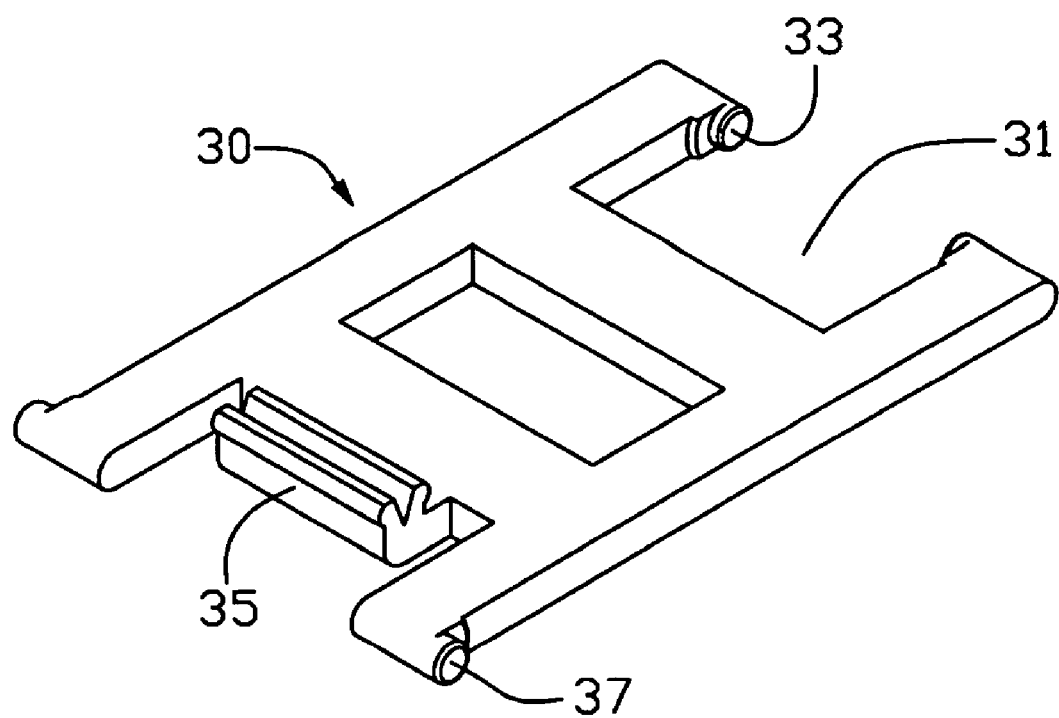
FIG. 2 is an another isometric view of the intermediate member.

Referring to FIGS. 1a, 1 and 2, a computer case 1 of an electronic device like a computer in accordance with a preferred embodiment of the present invention includes a chassis 70, a securing member 50 mounted in the chassis 70, a cage 10, and an intermediate member 30 connecting the securing member 50 and the cage 10.

The chassis 70 includes a bottom wall 71. Aside wall 73 and a front wall 75 extend vertically from adjacent edges of the bottom wall 71 respectively. A support wall 77 extends inward and perpendicularly from a middle portion of the front wall 75. The side wall 73 and the support wall 77 respectively form a flange 731, 771. The bottom wall 71 defines a plurality of screw holes 711 therein. A substantially rectangular opening (not labeled) is defined in the front wall 75 for accommodating the cage 10. A hook 751 protrudes from a bottom edge of the opening.

The securing member 50 is generally rectangular. A protuberant portion 51 is formed at one end thereof. A receiving portion, such as an U-shaped receiving groove 57, is defined at the other end thereof. The protuberant portion 51 defines a shaft hole 53. A plurality of through holes 55 is defined therein adjacent to the protuberant portion 51 and the receiving groove 57 respectively, corresponding to the screw holes 711 of bottom wall 71 of the chassis 70. A plurality of screws 80 penetrates through the through holes 55 and screw into the corresponding screw holes 711, thereby mounting the securing member 50 on the bottom wall 71 of the chassis 70.

The intermediate member 30 is also generally rectangular. A cutout 31 is defined at a front portion thereof. A pair of front shafts 33 extends inward from opposite edges of the cutout 31 at entrance. A pair of rear shafts 37 extends outward from opposite edges of the intermediate member 30 at a rear portion. A resilient portion, such as a resilient claw 35 with a V-shaped groove defined, is formed between rear shafts 37 for detachably engaging in the receiving groove 57 of the securing member 50.

The cage 10 is adapted to accommodate components of the computer, for example, data storage devices (not shown) for communication and handling of data. Such devices include, for example, hard disk drives, floppy disk drives and Compact Disk-Read Only Memory (CD-ROM) drives. In the preferred embodiment of the present invention the cage 10 includes a bottom plate 11, and a pair of side plates 13 respectively extending from opposite edges of the bottom plate 11. A flange 131 horizontally extends from the top edge of each side plate 13. A pair of positioning plates 115 is formed downwardly at the bottom plate 11 by stamping. A sliding slot 117 is defined in each positioning plate 115 for the corresponding rear shaft 37 of the intermediate member 30 sliding therein. The circumferential hems of the sliding slots 117 are coarse. A brim 111 is bent from a front edge of the bottom plate 11. A narrow slot 113 is defined along the brim 111, corresponding to the hook 751 of the chassis 70.

Figure 3:
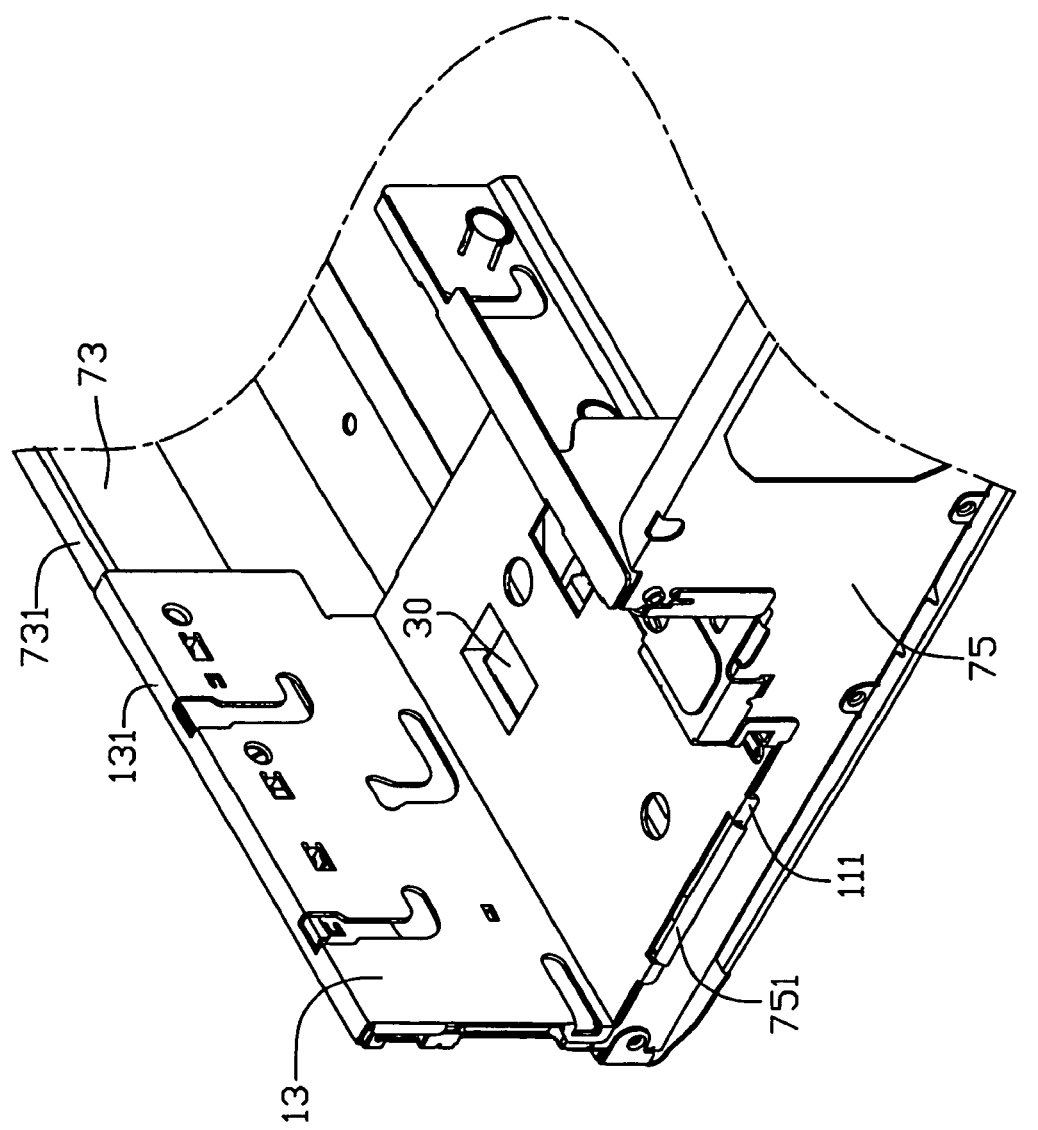
FIG. 3 is a first assembled view of FIG. 1, showing the cage in a locked position.
Figure 4:
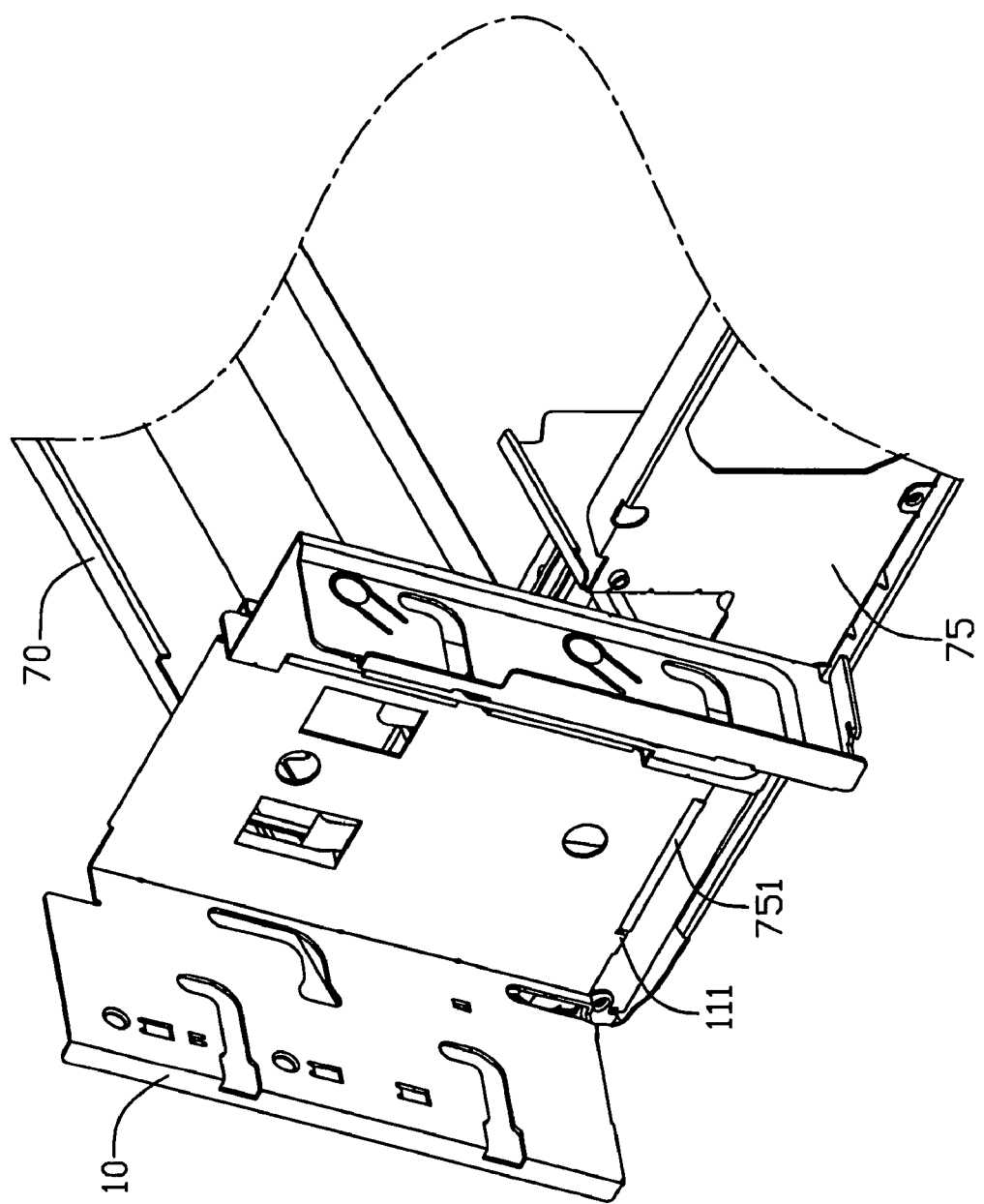
FIG. 4 is a second assembled view of FIG. 1, showing the cage rotated out of the chassis and in a unlocked position.
Figure 5:
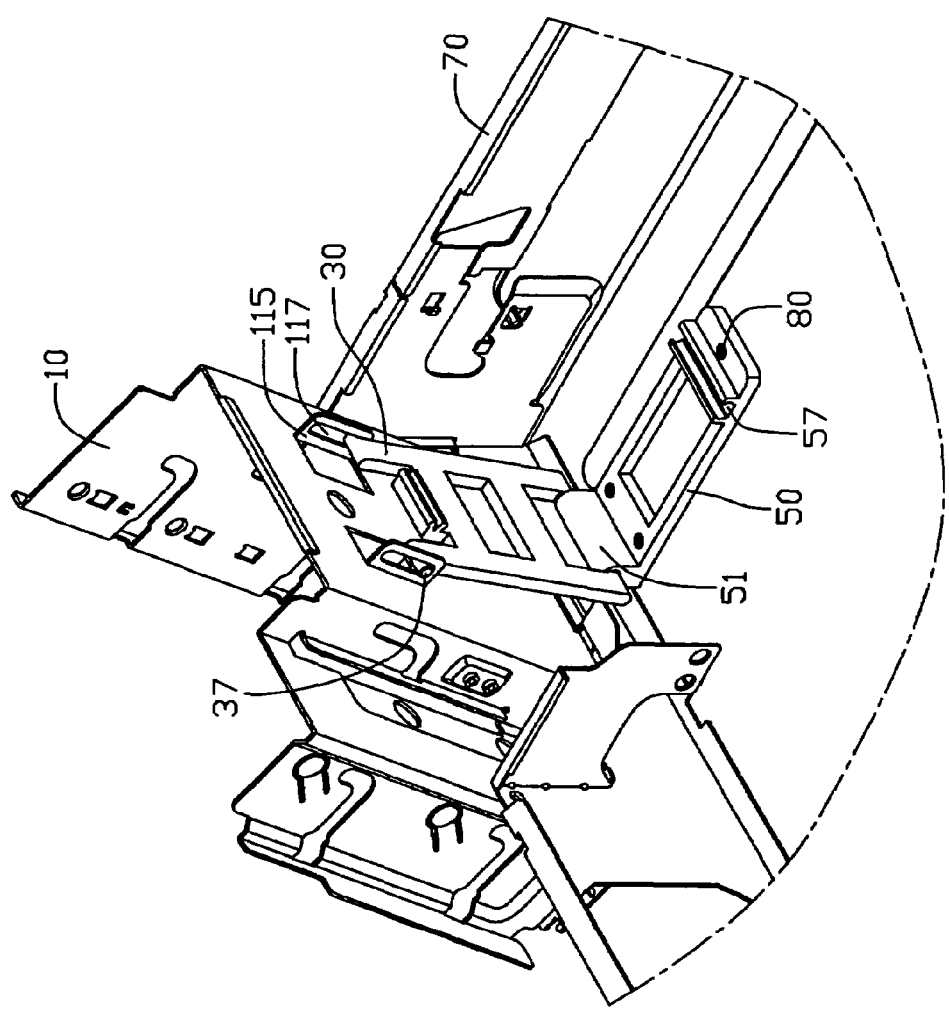
FIG. 5 is an another isometric view of FIG. 4.

Referring also to FIGS. 3 to 5, in assembly, the securing member 50 is fixed onto the bottom wall 71 of the chassis 70 by the screws 80 which penetrate through the through holes 55 of the securing member 50 and engage into corresponding screw holes 711 of the bottom wall 71 of the chassis 70. The cage 10 is placed into the chassis 70 along the opening. The hook 751 of the chassis 70 gets through the narrow slot 113 and catches the brim 111 of the cage 10. The cage 10 can be thus rotated around the brim 1 of the cage 10. The front shafts 33 of the intermediate member 30 are respectively accommodated into the shaft holes 53 of the securing member 50, thereby pivotably connecting the intermediate member 30 with the securing member 50. The rear shafts 37 of the intermediate member are slidably received into the corresponding sliding slots 117 of the positioning plate 115 of the cage 10 respectively, thereby pivotably connecting the intermediate member 30 with the cage 10.

When the cage 10 is inward rotated around the brim 111, the positioning plate 115 pushes the rear shafts 37 to rotate the intermediate member 30 around the front shafts 33 of the securing member 30. Simultaneously, the rear shafts 37 respectively slide along the sliding slots 117 of the positioning plates 115 from front ends to rear ends thereof. The resilient claw 35 of the intermediate member 30 is squeezed into and engages in the receiving groove 57 of the securing member 50, thereby horizontally mounting the cage 10 to the chassis 70. The cage 10 is in a locked position.

When other modules need to be maintained or assembled/disassembled, the cage 10 should be rotated upwardly from the locked position to vacate sufficient mounting space. The intermediate member 30 is brought along the cage 10 to rotate upwardly thereby. The resilient claw 35 of the intermediate member 30 is pulled out from the receiving groove 57 of the securing member 50. The rear shafts 37 of the intermediate member 30 slide from the rear ends to the front ends of the sliding slots 117 of the cage 10. The cage 10 is in an unlocked position, as shown in FIG. 4 and FIG. 5. As the circumferential hems of the sliding slots 117 are coarse, friction is produced between the rear shafts 37 and the hems of the sliding slots 117 when the rear shafts 37 are pressed. The intermediate member 30 supports the cage 10. The cage 10 is thus prevented moving from the unlocked position to the locked position.

In an alternative embodiment of the present invention, the securing member 50 can be directly formed on the chassis 70 without screws 80. The protuberant portion 51 and the receiving groove 57 can be directly formed in the chassis 70 respectively.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

What is claimed is:

1. A computer case comprising:
    a chassis comprising a bottom wall and a front wall perpendicular to the bottom wall;
    a cage pivotably engaging with the front wall of the chassis, the cage having a locked position and an unlocked position;
    a securing member mounted to the bottom wall of the chassis, a receiving portion being formed at the securing member; and
    an intermediate member comprising a first end pivotably connecting with the securing member, a second end away from the first end pivotably connecting with the cage, and a resilient portion corresponding to the receiving portion; wherein
    when the cage is in the locked position, the resilient portion engages in the receiving portion; when the cage is in the unlocked position, the resilient portion disengages from the receiving portion.

2. The computer case as claimed in claim 1, wherein a front shaft is formed at the first end of the intermediate member, and a shaft hole is defined in the securing member for pivotably receiving the front shaft.

3. The computer case as claimed in claim 1, wherein the resilient portion of the intermediate member comprises a resilient claw with a V-shaped groove defined therein for enhancing the deformation thereof.

4. The computer case as claimed in claim 1, wherein the receiving portion comprises an U-shaped groove.

5. The computer case as claimed in claim 1, wherein the front wall of the chassis defines an opening therein, and a hook is formed adjacent to the opening for engaging with the cage.

6. The computer case as claimed in claim 5, wherein the cage comprises a bottom plate with a slot being defined therein, and the hook of the chassis hooks into the slot and rotatably catches an edge of the slot of the cage.

7. The computer case as claimed in claim 1, wherein a positioning plate with a sliding slot is formed at the cage for connecting with the intermediate member.

8. The computer case as claimed in claim 7, wherein a rear shaft is formed at the second end of the intermediate member for slidably engaging in the sliding slot of the positioning plate.

9. The computer case as claimed in claim 8, wherein the sliding slot has coarse hems for increasing friction between the hems and the rear shaft of the intermediate member.

10. A computer case comprising:
    a chassis;
    a cage pivotably engaging with the chassis, the cage comprising a bottom plate, a positioning plate with a sliding slot defined therein extending from the bottom plate; and
    an intermediate member having one end connecting with the chassis and being pivotable relative to the chassis about a first axis, and the other end connecting with the positioning plate and being pivotable relative to the positioning plate about a second axis parallel to the first axis, said other end sliding in the sliding slot of the positioning plate along a direction perpendicular to the first and second axes.

11. The computer case as claimed in claim 10, wherein the chassis comprises a bottom wall, and the computer case further comprises a securing member mounted to the bottom wall for pivotably engaging with the intermediate member.

12. The computer case as claimed in claim 11, wherein a front shaft is formed at the intermediate member, and a shaft hole is defined in the securing member for pivotably receiving the front shaft, so as to pivotably engage said one end of the intermediate member with the chassis.

13. The computer case as claimed in claim 11, wherein the intermediate member comprises a resilient portion, and the securing member comprises a receiving portion for engaging with the resilient portion.

14. The computer case as claimed in claim 13, wherein the resilient portion comprises a resilient claw with a V-shaped groove defined.

15. The computer case as claimed in claim 13, wherein the receiving portion comprises an U-shaped receiving groove.

16. The computer case as claimed in claim 10, wherein the chassis comprises a front wall, and a hook is formed at the front wall for engaging with the cage.

17. The computer case as claimed in claim 16, wherein a slot is defined in the cage for receiving the hook.

* * * * *